United States Patent [19]
Cawlfield et al.

[11] Patent Number: 4,537,937
[45] Date of Patent: Aug. 27, 1985

[54] CHELATING RESIN AND PROCESS FOR MAKING SAME

[75] Inventors: David W. Cawlfield; William M. Moore; John L. Stubbs, Jr., all of Cleveland, Tenn.

[73] Assignee: Olin Corporation, Cheshire, Conn.

[21] Appl. No.: 579,233

[22] Filed: Feb. 13, 1984

[51] Int. Cl.$^3$ .............................................. C08L 79/00
[52] U.S. Cl. .................................. 525/417; 210/688; 521/29
[58] Field of Search ........................... 525/417; 521/29

[56] References Cited

U.S. PATENT DOCUMENTS

| | | | |
|---|---|---|---|
| 3,935,098 | 1/1976 | Oda et al. | 210/38 |
| 3,951,815 | 4/1976 | Wrasidlo | 525/417 |
| 4,404,346 | 9/1983 | Pirotta et al. | 521/29 |

FOREIGN PATENT DOCUMENTS 68300  6/1977  Japan.

OTHER PUBLICATIONS

J. Dingman, Jr., K. M. Gloss, E. A. Milano and S. Siggia, "Concentration of Heavy Metals by Complexation on Dithiocarbamate Resins", *Analytical Chemistry*, 46, No. 6, (May 1974), pp. 774–777.

D. S. Hackett and S. Siggia, "Selective Concentration and Determination of Trace Metals Using Poly(dithiocarbamate) Chelating Ion–Exchange Resins", *Environmental Analysis*, edited by G. W. Ewing, Academic Press, Inc., New York, New York, (1977), pp. 253–265.

*Primary Examiner*—Wilbert J. Briggs, Sr.
*Attorney, Agent, or Firm*—James B. Haglind; Donald F. Clements

[57] ABSTRACT

A resin chelating agent and process for making it are disclosed. The process comprises reacting the cross-linked product formed from the reaction of an aqueous suspension of a polyethyleneimine with a polycarboxylic acid with a mixture of a caustic agent comprising an alkali metal or alkaline earth metal hydroxide and carbon bisulfide to produce the finished resin. The resin can be produced in both bead and powder form and is capable of selectively removing a large number of metallic contaminants from process and waste water streams. It is also essentially insensitive to the presence of alkali metal and alkaline earth metal ions dissolved in said streams.

27 Claims, No Drawings

CHELATING RESIN AND PROCESS FOR MAKING SAME

BACKGROUND OF THE INVENTION

This invention relates to chelating resins which can be used to selectively remove heavy metal ions from aqueous solutions and to a process for preparing such resins.

One major problem in the chemical industry is the removal of an increasingly large number of pollutants from waste water and other process streams. Following the lead of the Federal Water Pollution Control Act of 1972 (commonly referred to as the "Clean Water Act"), many states, counties, and even cities are posting ever more stringent regulations concerning the discharge of a wide variety of polluting materials, both organic and inorganic. One group of materials causing particular concern is the "priority" pollutants as established under Section 307 of the Clean Water Act. These have been determined to present unusual hazards in terms of toxicity, carcinogenicity and/or mutagenicity. Presently included in this list are ions and salts of some 13 "heavy" metals which, along with the current federal drinking water and maximum allowable river discharge limits, are given in Table I.

TABLE I

| Pollutant Heavy Metal | Maximum Allowable Concentrations (ppm) |
| --- | --- |
| Antimony | 0.15 |
| Arsenic | 0.05 |
| Beryllium | 0.000037 |
| Cadmium | 0.01 |
| Chromium | 0.05 |
| Copper | 1.0 |
| Lead | 0.05 |
| Mercury | 0.002 |
| Nickel | 0.013 |
| Selenium | 0.01 |
| Silver | 0.05 |
| Thallium | 0.013 |
| Zinc | 5.0 |

In treating aqueous streams to remove these elements, it is found that these elements are not always found in cationic form. Rather, they may be incorporated into various anions, non-ionic complexes or bound in suspended particulates. Consequently, a plurality of treatments may be necessary to more or less completely remove them. This imposes a significant capital and operating cost penalty on any facility which is required to handle complex process chemicals in waste water streams, especially those having several of these pollutants present at the same time.

One approach to pollution abatement which appears to offer unusual cost effectiveness is the use of one or more chelating agents as absorption compounds. Capable of operating in a wide variety of chemical environments, such materials are finding wide use in treating process and waste water streams to selectively remove a considerable number of heavy metal compounds.

For this purpose, several different types of agents can be used, both inorganic and organic with several different treatment modes, including batch, fixed bed and fluidized bed processes being available. While some of these agents are quite specific in their selectivity, most are fairly general in this regard and are thus able to sequester and bind compounds of a large number of elements, often both in ionic and non-ionic form. This ability, while generally advantageous, can create a problem when solutions containing mixtures of "pollutants" and "non-pollutants" must be treated. To the extent that the non-pollutant is sequestered, the capacity of the agent for the pollutant or pollutants of interest is diminished. Since many of these agents can only be regenerated with great difficulty, if at all, such a problem can significantly shorten service life.

This situation arises, for example, in the chlor-alkali industry where the anolyte brines from mercury cells, after dechlorination and resaturation, nominally contain between about 1 and about 20 parts per million (ppm) of mercury and small amounts of other heavy metal contaminants such as iron, copper, lead and nickel. They also contain substantial amounts of non-pollutant sulfate, chlorate and alkaline earth metal ions such as calcium and magnesium, all in a concentrated brine of the alkali metal being electrolyzed. Where part of the brine is periodically purged, as for chlorate and sulfate control, the loss of the mercury dissolved therein frequently results in both a surprisingly large monetary loss as well as the creation of a significant environmental hazard.

One group of chelating agents which have showed unusual promise for selectively removing mercury and other heavy metals are the poly(dithiocarbamate) resins as reported by Hackett and Siggia of "Selective Concentration and Determination of Trace Metals Using Poly(dithiocarbamate) Chelating Ion-Exchange Resins" in *Environmental Analysis*, edited by G. W. Ewing, Academic Press, Inc., New York, New York, 1977, pages 253–265. These resins were found to sequester a large number of heavy metals while being essentially insensitive to the presence of alkali and alkaline earth metal ions in solution.

Their procedure for making these resins comprised reacting, in dioxane solution, an 8:1 mixture of an anhydrous polyethyleneimine-1800 molecular weight and a polymethylene polyphenylisocyanate to form a solid polyamine-polyurea crosslinked precursor. This, in turn, was reacted with a mixture of $NH_4OH$ and $CS_2$ in isopropyl alcohol over a period of about 4 weeks to form resins having a sulfur content of about 18 percent and an equivalent $Cu^{+2}$ capacity (milliequivalents of Cu absorbed/gram of dry resin from an aqueous solution at a pH of about 4.8) of between about 0.8 and 1.35. If followed rigorously, the above procedure for making such resins possesses a number of serious disadvantages, in terms of producing the large quantities needed for use in industrial applications. For example, the 4–5 week total reaction time imposes significant costs on the production cycle.

However, more recent work by Miyazaki and Barnes of "Complexation of Some Transition Metals, Rare Earth Elements, and Thorium with a Poly(dithiocarbamate) Chelating Resin" in *Analytical Chemistry*, Vol. 53, No. 2, February 1981, pages 299–304, have shown that $NH_4OH/CS_2$ reaction time can be reduced to as short a time as 8–16 hours with essentially equivalent results. Secondly, it was shown that both lower molecular weight polyimines and a variety of polyisocyanates can be used.

The common elements in these prior art studies are the use of dioxane as the solvent and an anhydrous polyamine used as a precursor reactant. Dioxane is a federally listed health hazard and it would be highly desirable if less hazardous solvents could be used. It is known that polyethyleneimines can be supplied as aqueous suspensions at attractive prices. However, they are, at best, only sparingly soluble in dioxane and attempts to form a satisfactory precursor resin from such a material almost invariably end in failure. The reason for this appears to be that the water in the suspension saturates the dioxane thus effectively inhibiting its ability to dissolve the polyimine so that very little, if any, is available to react with the polyisocyanate. Further, it is also known that the reaction forming the precursor need not be limited to isocyanate crosslinkers.

OBJECTS OF THE INVENTION

It is an object of the present invention to provide a chelating resin which when admixed with chemical process and waste water streams will selectively remove heavy metal pollutants dissolved therein.

It is a further object of the present invention to provide a chelating resin capable of selectively removing heavy metal contaminants from chlor-alkali cell brines without removing alkaline earth metal ions dissolved therein.

It is still a further object of the present invention to provide a process for preparing said chelating resin.

These and other objects of the subject invention will become apparent from the following description and the appended claims.

BRIEF STATEMENT OF THE INVENTION

The present invention is a chelating resin and a process for producing it, which comprises:
 (a) reacting an aqueous suspension of a polyethyleneimine with a polycarboxylic acid to produce a crosslinked polyamido precursor resin;
 (b) breaking up the precursor resin by saturation with a first polar solvent;
 (c) grinding the broken precursor to a uniform particle size below about 0.25";
 (d) suspending said ground precursor resin in a second polar solvent and reacting said precursor resin a mixture comprising about a stoichiometric amount of carbon bisulfide and a hydroxyl containing compound selected from the group consisting of alkali metal hydroxides, alkaline earth metal hydroxides and ammonium hydroxide, whereby said resin chelating agent is produced, for a period of between about 4 and about 20 hours; and
 (e) separating said resin from said mixture.

This produces a granular resin having substantial capabilities to sequester heavy metals in a variety of aqueous environments while being essentially insensitive to alkali metal and alkaline earth metal ions dissolved therein.

DETAILED DESCRIPTION OF THE INVENTION

The present invention is a resin chelating agent suitable for removing heavy metals from chemical process and waste water streams and a process for producing it.

The process for producing this resin starts with an aqueous suspension of a polyethyleneimine being reacted with a polycarboxylic acid to produce a crosslinked polyamido precursor resin.

For this reaction, a variety of starting materials can be used. Useful polyimines include those with an average molecular weight ranging from about 10,000 to about 500,000, all having the general formula:

in aqueous suspensions containing from between about 20 to about 80 percent by weight of polyethyleneimine. While any of these can be used, higher percentage suspensions should be used so as to minimize the amount of water which must subsequently be removed. Aqueous suspensions of polyimines containing about 40 to about 60 percent by weight of polyethyleneimine, with an average molecular weight ranging from about 40,000 to about 70,000, are preferably employed.

To produce the polyamido crosslinked precursor, a polycarboxylic acid or anhydride having the general formula

where n=2 or 3 and where R is either an aliphatic chain having from 1 to about 8 carbon atoms or an aromatic ring is used. Suitable compounds include malonic, succinic, glutaric, adipic, pimelic, suberic, azelaic, sebacic, maleic, fumaric, phthalic, isophthalic and terephthalic acid and maleic, succinic, phthalic and trimellitic anhydride. The precursor resin produced is a function of both the starting materials used and the ratio of the reactants. In the process of this invention, it has been found that with the preferred reactants a polyimine/polycarboxylic acid weight ratio of between 4:1 to about 20:1, with between about 8:1 and about 12:1 being preferred, will yield satisfactory precursor resins.

Drastic measures are not required to initiate the reaction. It is found that the polyamine will dissolve the polycarboxylic acid within a few minutes to produce a homogeneous solution at room or only slightly elevated temperatures with continuous stirring (i.e. between about 20° and about 30° C.).

The crosslinking reaction is completed by heating the solution, under vacuum, at a temperature of between about 150° and 180° C. for between about 2 and about 20 hours. Such a procedure also evaporates the free water present.

After cooling, the dried precursor is mixed with an excess of deionized water which causes it to swell and fracture into a multiplicity of small granules having diameters between about 0.5 and about 10 mm. The resultant slurry is then wet ground to produce a more uniform product with a maximum particle size of about 1 mm being preferred. The ground particles are separated by filtration or centrifuging from the water, and then given several washings with deionized water and an alcohol, preferably methanol. The chelating resin of this invention is prepared by suspending the washed precursor particles in a polar solvent such as water or an aliphatic fluid such as alcohol or ketone such as methanol, ethanol, isopropyl alcohol, acetone, methyl ethyl ketone and similar compounds having up to about 5 carbon atoms, with water or methanol in an amount equal to about 3–6 times the volume of the ground particles being preferred.

The chelating resin of the present invention is produced when about a stoichiometric amount and, preferably between about 0.5 and about 3 times the stoichiometric amount, of a mixture of carbon bisulfide and a concentrated solution of an alkali metal, (preferably sodium hydroxide) or alkaline earth metal hydroxide is added to the mixture and reacted therewith for a period of between about 4 and about 20 hours. The volumetric ratio of concentrated hydroxide solution to carbon bisulfide is generally in the range from about 0.7:1 to about 2:1 and preferably from about 0.8:1 to about 1.3:1. This produces a granular chelating resin which has a sulfur content of between about 30 and about 45 percent by weight and an equivalent $Cu^{+2}$ capacity of between about 4 and about 6; such values being exceptionally high when compared to prior art resins.

After a final filtration and washing with alcohol to remove unused reactants, the chelating resin is vacuum dried at a slightly elevated temperature after which it is immediately usable.

The exact formula of the finished resin is unknown. However, without wishing to be bound thereby, it is postulated that it is of the general formula:

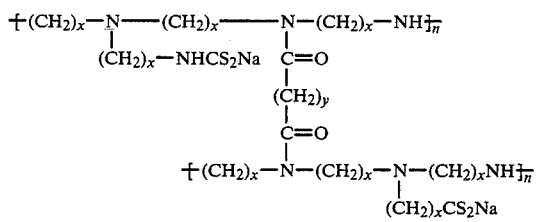

where n, x and y are functions of the particular imine and polyacid compounds used.

The resin is usable over a wide range of operating conditions and solution concentrations. Thus, for example, in the chlor-alkali industry, it can be used with anolyte brines having between about 150 and about 300 grams per liter (g/l) NaCl, at pH values ranging from about 2 to about 13 without noticeable degradation. Further, when used with anolyte brines as produced in modern mercury cathode or membrane chlor-alkali cells, it appears to be unaffected by the levels of chlorate or sulfate typically found therein. Further, in such an environment, it shows no signs of significant physical degradation as a result of long-term exposure.

The resin of this invention may be utilized in various conventional processes of absorption. These include simple stirred contact for batchwise operation or packed tower systems for continuous operation either in fixed bed or in fluidized bed modes. In fixed bed operation, it is immaterial whether up-flow or down-flow is used. For continuous flow operation, the space velocity (ml/min./cm$^3$ of resin) should be between about 0.15 and about 0.45, with about 0.2 to about 0.32 being preferred. Absorption efficiency can be improved even further by series operation of two or three absorption stations.

In use, it is found that the resin will remove substantially all of mercury, copper, zinc, nickel, cadmium, silver, chromium (+3), thallium and lead from aqueous solutions. These elements comprise 9 of the 13 metallic ions defined as "priority" pollutants under Section 307 of the Federal Clean Water Act from aqueous solutions.

It has also been found that the resin can sequester a number of other metallic contaminants as well. Thus, it can remove dissolved iron, titanium, cobalt, molybdenum, silicon, vanadium, manganese, gold, platinum, rhodium and uranium. These results are obtainable with these contaminants being present either alone or in combination with others and, in many cases, it does not seem to matter whether they are in cationic or anionic form.

To suit particular needs, the resin can be prepared in several forms, for example, in the shape of granules or powder depending on how much the precursor was ground. Further, various means can be utilized to enlarge the specific surface area (m$^2$/g) of the resin so as to enhance its chelating capacity. One such means is the use of a carrier material which holds the resin either in an impregnated state or as a covering on its surfaces. For this, many types of carriers may be used but porous materials having specific surface areas of at least and preferably larger than 1 m$^2$/g are preferred. Such materials readily available include diatomaceous earth, pumice stone, zeolite, ground coke, activated charcoal, graphite, bentonite and open cell foamed urethane resins. For maximum absorption effectiveness, the carrier particle size should be between about 0.05 to about 2.0 mm in diameter. Techniques for making such structures are known in the art.

The efficacy of the procedure for treating a heavy metal contaminated solution is shown in the following examples. All parts and percentages are by weight unless specified otherwise.

EXAMPLE 1

Resin Preparation

Chelating resin of the present invention was prepared by slowly adding, at room temperature, about 25 g of adipic acid to about 500 g of a 50 percent aqueous suspension of a polyethyleneimine having a molecular weight of between about 40,000 and about 70,000, as supplied by the Eastman Kodak Company, and stirring the mixture until the acid was fully dissolved. This produced about 282 g of an amorphous precipitate of a polyamido precursor which, after standing for about 3 hours at about 155° C. to evaporate excess water, was recovered by vacuum drying at about 0.1 millimeters (mm) of Hg at 160° C. for an additional 17 hours. The dried product, after cooling, was suspended in about 1,000 milliliters (ml) of deionized water which caused it to swell and break up. The resulting slurry was then ground and classified to about 42 mesh, after which the particles were separated therefrom by filtration. The filter cake was washed once with 500 ml of deionized water and three times with about 300 ml of methanol to remove any unreacted components.

The washed precursor resin was then suspended in about 1,000 ml of methanol to which was added about 300 ml of 50 percent NaOH solution. Over a two-hour period, 300 ml of carbon bisulfide were slowly added with stirring at a rate sufficient to maintain the solution at about room temperature. After all of the carbon bisulfide was added, the contents were allowed to stand for 17 hours without stirring, after which the resin was recovered by filtration, washed with about 1,000 ml of methanol and dried in a vacuum oven at 40° C. and 0.1 mm pressure. This yielded about 452 g of finished resin which was sieved to obtain a uniform distribution of between 25 and 75 mesh.

EXAMPLE 2

A 0.5 inch (O.D.) by 18 inch glass column was packed with 2.6 g of the dry resin of Example 1. An aqueous solution containing about 50 ppm of Hg$^{+2}$ ion (Hg(NO$_3$)$_2$), 5,000 ppm NaCl and 1,000 ppm Na$_2$CO$_3$ and having a pH of about 10 was passed through the resin at a flow rate of 4.0 ml/min. The effluent solution contained between about 0.4 and 13 parts per billion (ppb) of mercury, said flow rate being maintained for about 160 hours of processing, at which time the capacity of the column was reached. The absorption of mercury was about 0.68 g of mercury per gram of resin on a dry basis. This is equivalent to approximately 7 milliequivalents (meq) of mercury per gram of resin.

EXAMPLE 3

The resin of Example 1 was evaluated, using a Fisher Titrimeter II which was set in a mode to maintain a constant potential on a mercury ion specific electrode to measure absorption capacity. The electrode was positioned into 100 ml of a 100 ppm Hg solution comprising 10 ml of 1 normal $HNO_3/1$ molar $KNO_3$, 2 ml of 5,000 ppm standard mercury solution and 88 ml of deionized water. To this solution, 0.25 g of resin were added. As the resin removed the mercury ions from the solution, a standard solution of 5,000 ppm mercury, produced by adding 5.4 g of mercuric oxide to 1 liter of 0.1 molar $HNO_3$ was added at a rate sufficient to maintain a 100 ppm concentration of mercury.* The titration was continued until the resin failed to absorb additional mercury ions. The amount of mercury absorbed was 1.3 g per gram of dry resin which equals about 13 meq of mercury per gram of dry resin.
*EPA Priority Pollutant.

EXAMPLE 4

The procedure of Example 3 was repeated with the exception that the mercury containing solution was replaced by solutions containing approximately the same amount of $Cu^{+2}$, $Zn^{+2}$, $Ni^{+2}$, $Cd^{+2}$ and $Ag^{+1}$ with results as follows:

| Metal Ion | Capacity Grams/Gram of Resin (Dry) | Meq/Gram of Resin (Dry) |
|---|---|---|
| $Cu^{+2}$* | 0.21 | 6.4 |
| $Zn^{+2}$* | 0.21 | 6.4 |
| $Ni^{+2}$* | 0.19 | 6.5 |
| $Cd^{+2}$* | 0.37 | 6.6 |
| $Ag^{+1}$* | 0.70 | 6.5 |

EXAMPLE 5

The procedure of Example 2 was repeated with an aqueous solution containing 20 ppm each of $Ag^{+1}$, $Zn^{+2}$, $Cu^{+2}$, $Cr^{+3}$*, $Ni^{+2}$ and $Cd^{+2}$. When used, the resin removed all metals to below the limits of detectability (0.1 ppm) until capacity was reached.
EPA Priority Pollutant.

EXAMPLE 6

To further demonstrate the chelation properties of the resin, 0.5 g of the resin of Example 1 were added to a group of 100 ml solutions, each of which contained 1,000 ppm of various heavy metal ions. After mixing for 10 minutes, the solutions were allowed to stand and the metal content in solution was determined after 5 and again after 72 hours. The results are shown below:

| Starting Material | Metal Ion | Solution Concentration After 5 Hours (ppm) | Solution Concentration After 72 Hours (ppm) |
|---|---|---|---|
| $HAuCl_4$ | $AuCl_4^{-1}$ | 610 | 16 |
| $H_2PtCl_6$ | $PtCl_6^{-2}$ | 308 | 17 |
| $Se(NO_3)_2$* | $Se^{+2}$ | 631 | 423 |
| $PdCl_2$ | $Pd^{+2}$ | 586 | 8 |
| $SbCl_3$* | $Sb^{+3}$ | 552 | 558 |
| $BeCl_2$* | $Be^{+2}$ | 795 | 792 |
| $TlNO_3$* | $Tl^{+1}$ | 121 | 15 |
| $UO_2(NO_3)_2$ | $UO_2^{+2}$ | 583 | 22 |
| $RhCl_3$ | $Rh^{+3}$ | 583 | 191 |
| $AsCl_3$* | $As^{+3}$ | 271 | — |

*EPA Priority Pollutant.

EXAMPLE 7

Two grams of the resin of Example 1 were added to 100 ml of a solution containing 1,000 ppm of $Pb(NO_3)_2$*. The mixture was shaken twice, allowed to stand overnight and filtered. The filtrate contained $<0.1$ ppm $Pb^{+2}$.
*EPA Priority Pollutant.

EXAMPLE 8

Using the column of Example 2, 100 gallon samples of raw effluent from a mercury cell sump were adjusted to pH 13, 7 and 3 with hydrochloric acid, and treated to remove ionic mercury by passing through a packed column of the resin of Example 1 at a flow rate of 100 ml/min. The following data on reduction of mercury concentration were obtained:

| $Hg^{+2}$ Concentration (ppm) | pH 3 | pH 7 | pH 13 |
|---|---|---|---|
| Feed | 0.05 | 0.19 | 2.04 |
| Outlet | 0.002 | 0.04 | 0.08 |

EXAMPLE 9

The procedure of Example 1 was repeated with the exception that an aromatic diacid was used in place of the adipic acid. The procedure was as follows: To a 400 ml beaker containing of 100 g of 50 percent polyethyleneimine in water, 5 g of terephthalic acid was added with stirring. The homogeneous mixture was placed directly in a vacuum oven and heated at 170° C. for 6 hours at 0.1 mm pressure. After cooling to room temperature, 300 ml of water were added to swell the resin. After filtering, grinding and classifying operations, the resulting 215 g of prepolymer was washed with an excess of water. To demonstrate the addition of carbon bisulfide under different conditions, the wet prepolymer was separated into three 65 g portions.

The first 65 g portion was first transferred to a 600 ml beaker containing 300 ml of methanol and 40 ml of 50 percent NaOH. Over a two-hour period, 30 ml of carbon bisulfide was added. After 17 hours of standing without stirring, the solids were filtered, rinsed with methanol and dried in a vacuum oven at 40° C. to yield 30 g of finished resin (Resin A).

The second 65 g portion was transferred to a beaker containing 300 ml of water and 40 ml of 50 percent NaOH. When admixed with 30 ml of carbon bisulfide, this produced 28 g of finished resin (Resin B).

The third 65 g portion was reacted, using the same procedure, with 30 ml of carbon bisulfide and 30 ml of 35 percent $NH_4OH$ in 300 ml of acetone. The yield of the finished resin was 30 g (Resin C).

The procedure of Example 3 was repeated with the following results:

| Resin | Capacity Hg$^{+2}$ | |
|---|---|---|
| | Grams/Gram of Resin (Dry) | Meq/Gram of Resin (Dry) |
| A | 1.12 | 11.2 |
| B | 0.92 | 9.2 |
| C | 1.32 | 13.2 |

This procedure was repeated with the exception that the solution contained 20 ppm of copper with the following results:

| Resin | Capacity Cu$^{+2}$ | |
|---|---|---|
| | Grams/Gram of Resin (Dry) | Meq/Gram of Resin (Dry) |
| A | 0.196 | 6.1 |
| B | 0.188 | 5.9 |
| C | 0.136 | 4.3 |

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A process for preparing a resin chelating agent comprising:
   (a) reacting an aqueous suspension of a polyethyleneimine with a polycarboxylic acid to produce a crosslinked polyamido precursor resin;
   (b) breaking up the precursor resin by saturation with a first polar solvent;
   (c) grinding the broken precursor resin to a uniform particle size below about 1 millimeter;
   (d) suspending said ground precursor resin in a second polar solvent and reacting said precursor resin in a mixture comprising carbon bisulfide and a hydroxyl containing compound selected from the group consisting of alkali metal hydroxides, alkaline earth metal hydroxides, and ammonium hydroxide, whereby said resin chelating agent is produced; and
   (e) separating said resin from said mixture.

2. The process of claim 1 wherein said polyethyleneimine is a polyethyleneimine having an average molecular weight of between about 40,000 to about 70,000.

3. The process of claim 1 wherein said aqueous polyethyleneimine suspension contains between about 40 to about 60 percent by weight of polyethyleneimine.

4. The process of claim 1 wherein said polycarboxylic acid has the general formula R(COOH)$_n$ where n=2 or 3 and where R is an aliphatic chain having from 1 to about 8 carbon atoms or an aromatic ring.

5. The process of claim 4 wherein R is selected from the group consisting of malonic, succinic, glutaric, adipic, pimelic, suberic, azelaic, sebacic, maleic, fumaric, phthalic, isophthalic and terephthalic acid and maleic, succinic, phthalic and trimellitic anhydride.

6. The process of claim 5 wherein said polycarboxylic acid is adipic acid.

7. The process of claim 5 wherein said polycarboxylic acid is terephthalic acid.

8. The process of claim 1 wherein the weight ratio of said polyethyleneimine to said polycarboxylic acid is from about 4:1 to about 20:1.

9. The process of claim 8 wherein said weight ratio is between about 8:1 and about 12:1.

10. The process of claim 1 wherein said polyethyleneimine and said polycarboxylic acid are reacted at a temperature of between about 20° and about 180° C.

11. The process of claim 10 wherein the reaction time is between about 2 and about 20 hours.

12. The process of claim 1 wherein said first and second polar solvents have up to about 5 carbon atoms, said solvents being selected from the group consisting of methanol, ethanol, isopropyl alcohol, acetone and methyl ethyl ketone.

13. The process of claim 1(c) wherein said first polar solvent is water.

14. The process of claim 1(d) wherein said second polar solvent is methanol.

15. The process of claim 1(d) wherein said hydroxyl containing compound is sodium hydroxide.

16. The process of claim 1(e) wherein said separation comprises filtering.

17. The process of claim 1(e) wherein said separation comprises centrifuging.

18. The process of claim 1(e) wherein said separated resin is dried under vacuum.

19. A resin chelating agent prepared by the process which comprises:
   (a) reacting an aqueous suspension of a polyethyleneimine with a polycarboxylic acid to produce a crosslinked polyamido precursor resin;
   (b) breaking up the precursor resin by saturation with a first polar solvent;
   (c) grinding the broken precursor resin to a uniform particle size below about 1 millimeter;
   (d) suspending said precursor in a polar solvent and reacting said precursor resin a mixture comprising sodium hydroxide and carbon bisulfide, said resin having a sulfur content of between about 30 and about 45 percent by weight and an equivalent Cu$^{+2}$ capacity of between about 4 and about 6; and
   (e) separating said resin from said mixture.

20. The resin of claim 19 wherein said polyethyleneimine is a polyethyleneimine having an average molecular weight of between about 40,000 to about 70,000.

21. The resin of claim 19 wherein said aqueous polyethyleneimine suspension contains between about 40 to about 60 percent by weight of polyethyleneimine.

22. The resin of claim 19 wherein said polycarboxylic acid has the general formula R(COOH)$_n$ where n=2 or 3 and where R is an aliphatic chain having from 1 to about 8 carbon atoms or an aromatic ring.

23. The resin of claim 22 wherein R is selected from the group consisting of malonic, succinic, glutaric, adipic, pimelic, suberic, azelaic, sebacic, maleic, fumaric, phthalic, isophthalic and terephthalic acid and maleic, succinic, phthalic and trimellitic anhydride.

24. The resin of claim 23 wherein said polycarboxylic acid is adipic acid.

25. The resin of claim 23 wherein said polycarboxylic acid is terephthalic acid.

26. The resin of claim 19 wherein the weight ratio of said polyethyleneimine to said polycarboxylic acid is from about 4:1 to about 20:1.

27. The resin of claim 26 wherein said weight ratio is between about 8:1 and about 12:1.

* * * * *